United States Patent Office 3,312,093
Patented Apr. 4, 1967

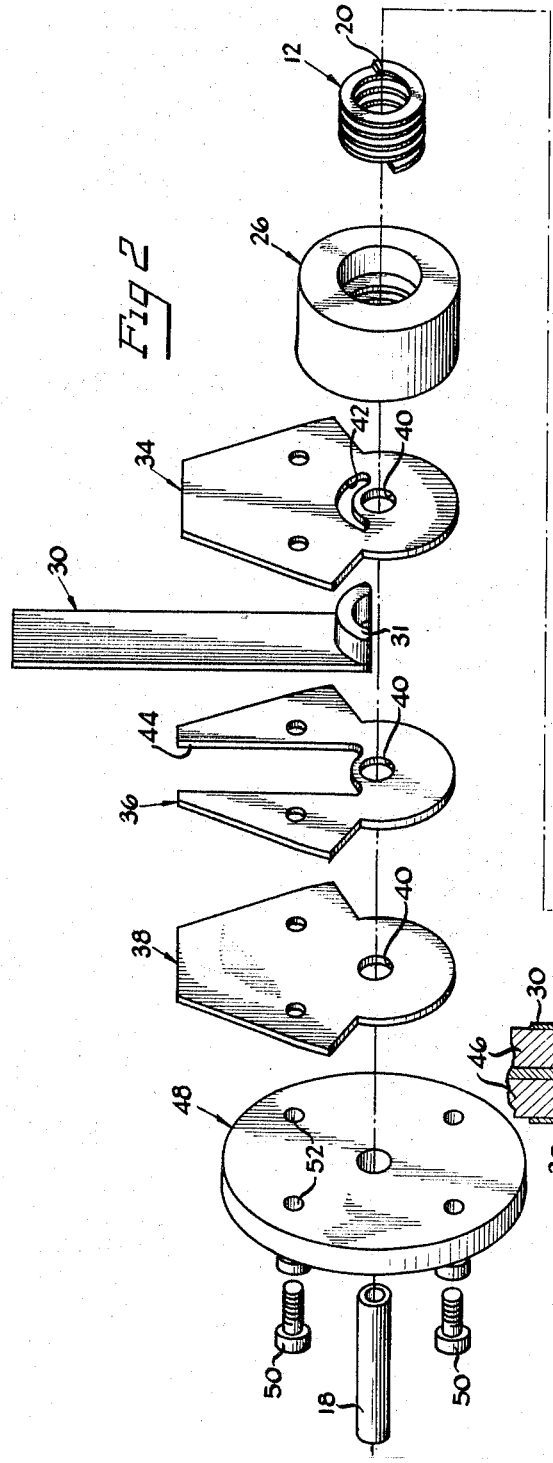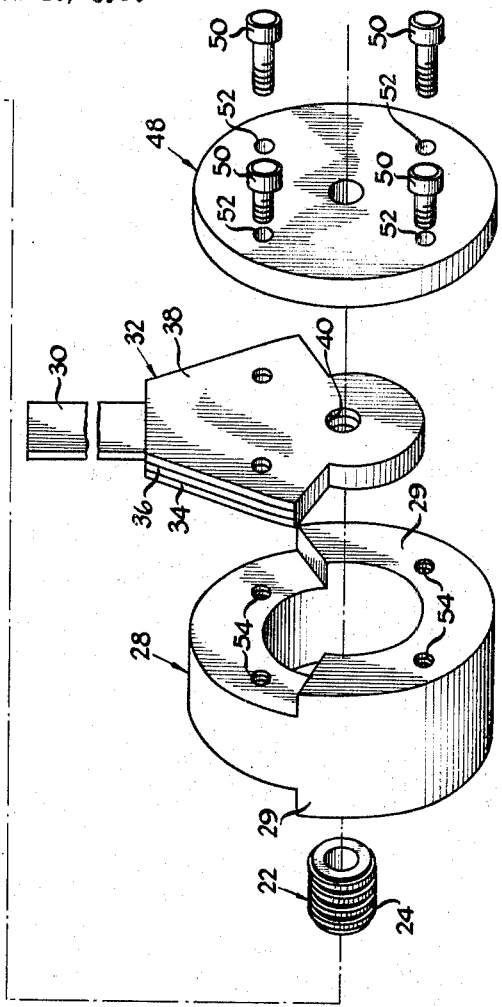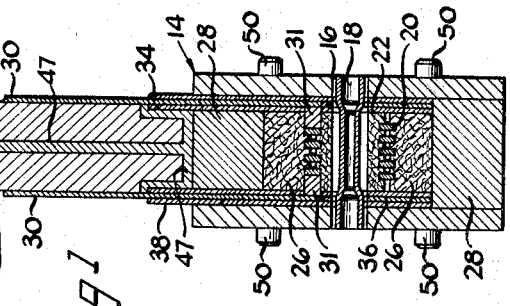
INVENTOR.
David F. Brower

3,312,093
COIL CONSTRUCTION
David F. Brower, San Diego, Calif., assignor to General Dynamics Corporation, New York, N.Y., a corporation of Delaware
Filed Mar. 16, 1964, Ser. No. 352,183
7 Claims. (Cl. 72—56)

This invention relates to electromagnetic forming apparatus and, more particularly, to devices adapted for use as a component of such apparatus and capable of producing a magnetic field of high flux density.

Use of an intense magnetic field to provide the energy to perform work on a workpiece has found considerable application. For example, metal has been formed into desired shapes by using an intense expanding or collapsing magnetic field to induce current flow in a conductive workpiece. Interaction between the induced current and the magnetic field subjects the workpiece to a force proportional to the energy density of the field; when the workpiece is partially restrained against movement incident to the action of this force, the workpiece is deformed into a desired shape. Method and apparatus for so forming metal are disclosed in U.S. Patent No. 2,976,907.

In practice, the high intensity magnetic field is produced by a coil which is preferably capable of creating a high flux density and, hence, a high energy density, immediately adjacent a surface of the workpiece. However, this coil is subjected to forces in reaction to those forces which form the workpiece and conventional coils are incapable of withstanding the effect of such forces. Also, the high intensity magnetic field produced by the coil has a tendency to interfere with the operation of neighboring apparatus and instruments, thereby creating a problem in the use of such equipment.

In providing support for the coil, and in shielding it from surrounding equipment, it is important that the construction utilized not detract from the efficiency of the coil by causing an undesirable dissipation of the energy of the magnetic field. The forms of construction which favors each of these desired characteristics, i.e., support, shielding and conservation of the energy of the field, are in some respects incompatible (e.g. the field may tend to induce eddy currents in a shielding structure, thereby causing a dissipation of energy from the field) and a construction which represents the best possible comprise has heretofore been unavailable.

Accordingly, it is the object of the present invention to provide an arrangement of elements which will produce a high density field in the most efficient manner, while adequately supporting the flux-producing components and while shielding surrounding equipment from the effects of the field.

Another object of the present invention is to provide a device in which a flux-producing coil is adequately supported and is adequately shielded from near-by equipment while energy losses from the field are minimized.

A further object of the invention is the provision of an improved device capable of efficiently producing a magnetic field of high flux density for use in a magnetic forming operation, which device is particularly adapted to withstand forces exerted thereon during the forming operation and in the use of which energy losses from the field are minimized.

A still further object of the invention is the provision of a device capable of efficiently producing a magnetic field of high flux density while shielding the surrounding environment from the effects of such a field and while minimizing energy losses from the field.

Other objects and advantages of the invention will become apparent from the following description and the accompanying drawings, in which:

FIGURE 1 is a schematic side sectional view of a field-producing device showing various features of the invention, and illustrating a workpiece positioned within the device and formed to a desired shape; and FIGURE 2 is a partially exploded enlarged perspective view of the field-producing device of FIGURE 1 showing the workpiece in an un-formed condition.

Briefly, the field-producing device of the illustrated embodiment is particularly adapted to be used in a magnetic forming operation and is in the form of a coil 12 enclosed within an annular shell or casing 14 which protects the coil, provides support therefor during the forming operation, and reduces external fields which might affect adjacent equipment. The coil 12 and the annular protective shell or casing 14 define a central opening 16 to receive a workpiece 18 which is positioned therein and which is formed into the desired configuration when a high intensity current is passed through the coil 12. In the illustrated embodiment, the representative workpiece 18 is originally in the form of a cylindrical tube of conductive material (FIG. 2), which is subsequently constricted by the forming operation (FIG. 1).

The construction of the device is such that a high intensity magnetic field is provided immediately adjacent the outer surface of the workpiece 18 in the gap between the workpiece and coil. However, in order to minimize energy losses from the field due to the induction of eddy currents in the shell 14, the field is caused to be of a lower density in the gap between the coil and shell than in the gap between the workpiece and the coil. This is accomplished, in the illustrated embodiment, by providing a flux path of lower reluctance in the gap between the coil and shell than in the gap between the coil and workpiece, as hereinafter described.

More specifically, the coil 12 is preferably generally cylindrical in shape and is formed, in the illustrated embodiment, of a flat beryllium strip or wire 20 wound around the outer surface of a tubular insulator 22 provided with an external helical groove 24. The strip 20 is preferably of such a length that, when coiled, its axial length is less than that of the insulator 22 so that the coil terminates short of each end of the insulator to make possible a low reluctance path between the ends of the coil and end plates of the device, as will be described in further detail shortly. The hollow of the tubular insulator defines the central opening 16 of the device and receives the workpiece 18 which, when positioned in the opening 16, is also surrounded by the coil 12. The thickness of the walls of the insulator 22 defines the width of the gap between the coil and workpiece.

As previously mentioned, it is desirable that a maximum flux density be provided in the area immediately adjacent the surface of the portion of the workpiece desired to be formed and, consequently, the tubular insulator 22 preferably provides a path of high reluctance within the coil adjacent the workpiece compared to that provided by the material outside the coil. In this regard, the insulator 22 is provided with relatively thin walls so that the cross sectional area of the gap between the coil and workpiece is relatively small compared to that of the gap between the coil and the encircling portions of the shell 14, as hereinafter described.

The outer surface of the coil 12 is wrapped in an outer insulating material 26 and, in order that the flux density adjacent the shell, i.e., in the gap intermediate the coil and shell, may be low so as to minimize the amount of energy loss due to induced currents in the shell, this outer insulator is preferably of a low reluctance as compared to the reluctance of the inner insulator 22. In this regard, the insulator 26 is relatively thick-walled as compared to the insulator 22 so that the gap between the coil and shell will have a larger cross-sectional area than that between the coil and the workpiece. It has been found that satisfactory results are obtained when the wall thickness of the insulator 26 is several times that of the insulator 22.

The cylindrical package comprised of the outer insulator 26, the coil 12 and the inner insulator 22 is received within a hollow ring 28 which forms an intermediate section of the shell 14 and is desirably of a strong and conductive material such as steel. The ring 28 is generally annular in shape but is provided with semi-annular projections 29 on each of its opposite faces which are engaged by end plates, soon to be described. This enables the shell to best contain the magnetic flux.

The ring 28 serves to protect the coil from damage from external or environmental conditions. Also, in surrounding the coil, it serves to shield adjacent equipment and instruments from the magnetic field produced by the coil. Finally, the ring serves to provide structural support for the coil, which has a natural tendency to expand as a result of the reaction forces to which it is subjected during the forming operation. In this regard, the forces due to the reaction between the field of the coil and eddy currents which are unavoidably induced in the ring 28 counteract to some degree the forces due to the reaction between the field and the currents induced in the workpiece. The resultant uncompensated outward force on the coil is resisted by the physical strength of the ring 28.

In the illustrated embodiment, the coil 14 is formed so that the opposite ends of the conductor 20 are in general circumferential alignment but are recessed inwardly from the end faces of the insulators 22 and 26 and, hence, from the end plates of the shell, to provide the path of low reluctance previously referred to. Each of these ends of the coil are engaged by an electrical contact member 30 forming part of a contact assembly 32, hereinafter described.

More specifically, the contact members 30 are in the form of a flat conductive strip having an arcuate bead 31 located at one end which projects outwardly from one face of the strip for engagement with an end of the coil 20. Each contact assembly 32 comprises an inner insulating plate 34, an intermediate insulating plate 36, and an outer insulating plate 38, each plate having a generally circular configuration but including an extension at one edge which projects past the outer cylindrical surface of the ring 28 when the device is assembled to provide support for the contact member 30. Also, the edge of each plate opposite this extension is cut-away to receive the semi-annular projection 29 of the ring 28. A hole 40 extends centrally through each of the plates to permit access of the workpiece 18 to the center of the coil 12.

The innermost insulator plate 34 is in contact with one end of the ring 28 immediately adjacent one end of the insulators 22 and 26 but spaced from an end of the coil 12, and is provided with an arcuate slot 42 which is located so as to be positioned adjacent an end of the coil 12 when the device is assembled. The slot 42 accommodates the bead 31 of the contact member 30 and thereby positions the bead to engage one end of the coil 12. This construction also serves to maintain the contact member 30 in position against radial displacement and at the same time insulates the member from the shell while affording electrical contact to the coil 12.

The intermediate insulator plate 36 is provided with an elongated generally radial slot 44 to receive that portion of the contact member 30 which includes the bead 31. The outer insulator plate 38 overlies the face of the intermediate plate 36 opposite the plate 34 and insulates the outer face of the contact member 30, which is sandwiched between the plates but which extends past the upper edges thereof to facilitate connection to a source of high electrical potential.

To facilitate connection of the device to a source of high potential, a low inductance coupling means is fixed to the connectors 30 (FIG. 1) and comprises a pair of relatively heavy conductor bars 46, each of which is disposed in face to face engagement with the inner surface of one of the members 30. The pair of bars 46 are spaced a short distance from one another and from the outer wall of the ring 28 and a suitable insulation 47 is provided in the resulting spaces.

The device is closed by the provision of a metal plate 48 at each end thereof which is disposed adjacent each contact assembly 32 in face-to-face contact with an outer insulator plate 38 and in metal-to-metal contact with the projections 29 of the ring 28. Suitable fasteners 50 extend through holes 52 provided in the end plates and contact assembly and are threaded from opposite ends into threaded holes 54 provided in the ring 28. If desired, one of the end plates 48 may be separately grounded to insure the safety of the user. It will be noted that these end plates are spaced somewhat from the ends of the coil 20, thereby facilitating the provision of a path of low reluctance between the ends of the coil and the plates 48.

The operation of the illustrated device 10 may now be readily understood. When a high amplitude current pulse is passed through the contact members 30 and, hence, through the coil 12, an expanding magnetic field is established which induces eddy currents in the surface of the elongated hollow workpiece 18. The interaction between the induced current and the magnetic field causes a force to be applied to the workpiece which constricts it in the manner shown in FIGURE 1.

In the illustrated construction, the shell 14 serves to protect the coil from damage, shields nearby equipment from the effects of the magnetic field, and provides structural support for the coil. In addition, the particular arrangement of the components of the device serve to minimize energy losses from the magnetic field due to the shell.

Various modifications and changes may be made in the illustrated structure without departing from the spirit and scope of the invention.

Various features of the invention are set forth in the following claims.

What is claimed is:

1. A device for providing a high intensity magnetic field for use in a magnetic forming operation, said device comprising an electrically conductive helical coil adapted to receive the workpiece therein, and a conductive element encircling said coil and including a generally hollow continuous cylindrical section generally coaxial with the coil and a plate at each end of said cylindrical section to close same, at least one of said end plates including an opening through which a workpiece can be inserted into the center of the coil, said element being capable of withstanding forces equal to those forces applied to the workpiece and being arranged relative to said coil so as to minimize energy losses from the magnetic field produced by the coil and so as to shield the environment of the coil from the field.

2. A device for providing a high intensity magnetic field for use in a magnetic forming operation, said device comprising an electrically conductive coil adapted to receive the workpiece therein, a conductive shell including an element arranged concentrically relative to the coil disposed around said coil and substantially enclosing said coil, said shell including access means for affording access to the interior of said coil by the workpiece, the inner surface of said element being so positioned relative to said coil that the reluctance between said coil and said element is substantially lower than the reluctance between said coil and the workpiece, and a load-bearing insulating material interposed between and in contact with said coil and said shell capable of transferring reaction forces from said coil to said shell.

3. A device for providing a high intensity magnetic field for use in a magnetic forming operation, said device comprising an electrically conductive coil adapted to receive the workpiece therein, an electrically conductive shell having a cavity within which said coil is disposed, said shell substantially surrounding said coil, said cavity having walls which are generally parallel to the axis of said coil and which are sufficiently spaced from said coil so that the reluctance between said coil and said shell is substantially lower than the reluctance between said coil and the workpiece, and a load-bearing rigid hollow cylindrical member formed of an insulating material disposed within said shell in encircling coaxial relation to said coil capable of transferring reaction forces from said coil to said shell.

4. A device for providing a high intensity magnetic field for use in a magnetic forming operation, said device comprising an electrically conductive coil adapted to receive the workpiece generally centrally thereof, a conductive intermediate shell section outwardly of and extending concentrically around the sides of said coil with the inner surface of said shell section spaced from said coil sufficiently so that the reluctance between said coil and said intermediate shell section is substantially lower than the reluctance between said coil and the workpiece, a pair of conductive end shell sections secured to said intermediate shell section with each of said end shell sections substantially enclosing one end of said coil, at least one of said end shell sections including an aperture to permit insertion of the workpiece generally centrally of said coil, and insulated contact means disposed between each of said end shell sections and said intermediate shell section and insulated therefrom, said contact means being electrically connected to opposite ends of said coil and extending to a point external of said shell.

5. A device for providing a high intensity magnetic field for use in a magnetic forming operation, said device comprising an electrically conductive generally cylindrical coil formed by an elongated element wound in a spiral configuration so as to be open through the center and adapted to receive a workpiece therein, an electrically conductive shell having a generally cylindrical cavity within which said cylindrical coil is disposed, said shell substantially surrounding said coil and being effective to shield surrounding environment from the magnetic field produced by the coil, the cylindrical inner wall of said cylindrical cavity being spaced apart from said coil sufficiently so that the reluctance between said shell and the coil is substantially lower than the reluctance between the coil and the workpiece, whereby said coil is protected and nearby equipment is also protected against stray fields while effective operation of said coil in forming the workpiece is not inhibited, and a load-bearing insulating material interposed between and in contact with said coil and said shell capable of transferring reaction forces from said coil to said shell.

6. A device for providing a high intensity magnetic field for use in a magnetic forming operation, said device comprising an electrically conductive generally cylindrical coil formed by an elongated element wound in a spiral configuration so as to be open through the center and adapted to receive a workpiece therein, an electrically conductive intermediate shell section having a generally cylindrical cavity within which said cylindrical coil is disposed, the cylindrical wall of said cylindrical cavity of said intermediate shell section being disposed concentrically around said coil and spaced apart from said coil sufficiently so that the reluctance between the intermediate shell section and the coil is substantially lower than the reluctance between the coil and the workpiece, and a pair of conductive end shell sections secured to said intermediate shell section with each of said end shell sections substantially enclosing one end of said coil, at least one of said end shell sections including an aperture to permit positioning of a workpiece within said cylindrical coil, and insulated electrical contacts connected to said element and extending between said shell sections to points external of said shell sections, whereby said coil is protected and nearby equipment is also protected against stray fields while effective operation of said coil is forming the workpiece is not inhibited.

7. A device for providing a high intensity magnetic field for use in a magnetic forming operation, said device comprising an electrically conductive generally cylindrical coil formed by an elongated element wound in a spiral configuration so as to be centrally open to receive the workpiece generally centrally thereof, an electrically conductive intermediate shell section disposed generally concentrically around said coil, and having a generally cylindrical cavity in which said coil is received, the cylindrical wall of said cavity being spaced apart from the adjacent surfaces of said coil sufficiently so that the reluctance between said coil and said intermediate shell section is substantially lower than the reluctance between said coil and the workpiece, a pair of electrically conductive end shell sections secured to said intermediate shell section at opposite ends thereof, each of said end shell sections substantially enclosing one end of said coil and being adjacent to one end of said elongated element, at least one of said end shell sections including an aperture to permit positioning of the workpiece within said coil, and an insulated electrical contact connected to each end of said element and extending between said intermediate section and said adjacent end section to a point external of said shell sections.

References Cited by the Examiner

UNITED STATES PATENTS

| | | | |
|---|---|---|---|
| 3,088,200 | 5/1963 | Birdsall et al. | 72—56 |
| 3,092,165 | 6/1963 | Harvey | 72—56 |
| 3,126,937 | 3/1964 | Brower et al. | 72—56 |

CHARLES W. LANHAM, *Primary Examiner.*

RICHARD J. HERBST, *Examiner.*